US 8,611,611 B2

(12) United States Patent
Li et al.

(10) Patent No.: US 8,611,611 B2
(45) Date of Patent: Dec. 17, 2013

(54) THREE DIMENSIONAL HUMAN POSE RECOGNITION METHOD AND APPARATUS

(75) Inventors: Liang Li, Beijing (CN); Weiguo Wu, Beijing (CN)

(73) Assignee: Sony Corporation, Tokyo (JP)

( * ) Notice: Subject to any disclaimer, the term of this patent is extended or adjusted under 35 U.S.C. 154(b) by 194 days.

(21) Appl. No.: 13/223,593

(22) Filed: Sep. 1, 2011

(65) Prior Publication Data
US 2012/0057761 A1 Mar. 8, 2012

(30) Foreign Application Priority Data
Sep. 1, 2010 (CN) .......................... 2010 1 0272736

(51) Int. Cl.
*G06K 9/00* (2006.01)
(52) U.S. Cl.
USPC .......................................... 382/107; 382/197
(58) Field of Classification Search
None
See application file for complete search history.

(56) References Cited

U.S. PATENT DOCUMENTS

| | | | | |
|---|---|---|---|---|
| 2003/0063795 A1* | 4/2003 | Trajkovic et al. | ............. | 382/159 |
| 2008/0284784 A1* | 11/2008 | Liu et al. | ........................ | 345/474 |
| 2009/0175540 A1* | 7/2009 | Dariush et al. | ................ | 382/195 |
| 2010/0049675 A1* | 2/2010 | Ning et al. | ...................... | 706/12 |

OTHER PUBLICATIONS

Long Meng; Liang Li; Shuqi Mei; and Weiguo Wu "Directional Entropy Feature for Human Detection", Dec. 8-11, 2008, 19th International Conference on Pattern Recognition, pp. 1-4.*
Youding Zhu; Behzad Dariush; and Kikuo Fujimura, "Controlled Human Pose Estimation from Depth Image Streams", Jun. 23-28, 2008, IEEE Computer Society Conference on Computer Vision and Pattern Workshops, pp. 1-8.*

* cited by examiner

*Primary Examiner* — Bhavesh Mehta
*Assistant Examiner* — Siamak Harandi
(74) *Attorney, Agent, or Firm* — Oblon, Spivak, McClelland, Maier & Neustadt, L.L.P.

(57) ABSTRACT

The present invention discloses a three dimensional human pose recognition method and apparatus, where the three dimensional human pose recognition method includes steps of: a three dimensional pose initial recognition step of performing three dimensional pose recognition on an input image containing a human image to obtain image-based three dimensional human pose information; a sensor information acquisition step of acquiring, by a motion sensor, motion information of human articulation points; and a three dimensional pose correction step of correcting, with the motion information acquired by the sensor information acquisition step, the image-based three dimensional human pose information recognized by the three dimensional pose initial recognition step. According to the technical solution of the invention, it is possible to improve accuracy of the three dimensional human pose recognition efficiently. Further, the present invention also discloses a three dimensional human pose recognition method and apparatus, in which three dimensional half-body pose recognition is proposed, thereby speed of three dimensional human pose recognition can be improved significantly while improving accuracy of three dimensional human pose recognition.

14 Claims, 8 Drawing Sheets

THREE DIMENSIONAL HUMAN POSE RECOGNITION METHOD AND APPARATUS

FIELD OF THE INVENTION

The present invention relates to the field of computer vision and image processing, and more particularly, to a three dimensional human pose recognition method and apparatus.

BACKGROUND OF THE INVENTION

The method for recognizing human poses from an image can be classified as the model-based method and the learning-based method according to the technical principle. In the model-based method, first a human model consisting of various body parts of a human is established. A process of pose recognition is a process of searching for and matching the most similar pose in a feature space using the model. The process of searching is typically transformed into a problem of nonlinear optimization (for example, refer to non-patent literature 1) or a problem of probability density estimation (for example, refer to non-patent literatures 2 and 3). Since the number of dimensions of a pose space is extremely huge, this method may achieve a better effect only by combining with tracking in general. Accordingly, the effect of the pose recognition depends to a great extent on initialization situation of the model before tracking. Generally, this method also needs to know beforehand areas of various body parts of a human. In the learning-based method, a three dimensional human pose is concluded directly from image features. Image features which are widely used include body contour information (refer to non-patent literatures 4, 5 and 6). In order to obtain reliable contour information, the methods which have been adopted include motion analysis (refer to non-patent literature 4), background modeling (refer to non-patent literature 5) or a combination thereof (refer to non-patent literature 6). However, in the case that the background is rather complex, it is difficult to separate reliably the body contour for these methods. Other features which have been used also include truck detection (refer to non-patent literature 7), complexion information (refer to patent literature 1), and so on.

All the existing methods of human pose recognition treat body parts as a whole to perform pose recognition directly from an image. However, in a specific application scene, it is difficult to achieve high recognition accuracy through performing pose recognition merely from the image due to significant differences in clothing and figures of the body and complexity of the application environment. Moreover, since depth information can not be obtained accurately from a monocular two-dimension image, the recognition accuracy is further reduced.

[Non-patent literature 1] J. M. Rehg and T. Kanade, "Model-based tracking of selfoccluding articulated objects", ICCV, pages 612-617, 1995

[Non-patent literature 2] H. Sidenbladh, M. J. Black, and D. J. Fleet, "Stochastic tracking of 3d human figures using 2d image motion", ECCV (2), pages 702-718, 2000

[Non-patent literature 3] Mun Wai Lee, Cohen, I., "A model-based approach for estimating human 3D poses in static images", IEEE TPAMI 28(6), pages 905-916

[Non-patent literature 4] A. Agarwal and B. Triggs, "3d human pose from silhouettes by relevance vector regression", CVPR, vol 2, pages 882-888, 2004

[Non-patent literature 5] R. Rosales and S. Sclaroff, "Learning body pose via specialized maps", NIPS, 2002

[Non-patent literature 6] K. Grauman, G. Shakhnarovich, and T. Darrell, "Inferring 3d structure with a statistical image-based shape model", ICCV, 2003

[Non-patent literature 7] X. Ren, A. C. Berg, and J. Malik, "Recovering Human Body Configurations using Pairwise Constraints Between Parts", ICCV 2005

[Patent literature 1] YANG MING-HSUAN (US); HUA GANG (US), "HUMAN POSE ESTIMATION WITH DATA DRIVEN BELIEF PROPAGATION", Publication number: WO2006052853

SUMMARY OF THE INVENTION

The brief summary of the invention will be given below to provide basic understanding of some aspects of the invention. However, it shall be appreciated that this summary is neither exhaustively descriptive of the invention nor intended to define essential or important components or the scope of the invention but is merely for the purpose of presenting some concepts of the invention in a simplified form and hereby acts as a preamble of more detailed descriptions which will be presented later.

In view of the aforementioned prior art, an object of the invention is to provide a three dimensional human pose recognition method and apparatus, in which a three dimensional half-body pose recognition is proposed, thereby speed of the three dimensional human pose recognition can be improved significantly while improving accuracy of the three dimensional human pose recognition.

Another object of the invention is to provide a three dimensional human pose recognition method and apparatus, which combines the image-based three dimensional pose recognition method with motion information obtained from a motion sensor, to thereby improve accuracy of three dimensional human pose recognition efficiently.

In order to achieve the above objects, according to an aspect of the invention, there is provided a three dimensional human pose recognition method, including steps of: a half-body area determination step of determining, from an input image containing a human image, an image area of a half-body which is a left half portion or a right half portion of a human body; a feature extraction step of extracting, from the image area of the half-body determined by the half-body area determination step, a shape feature vector; and a three dimensional half-body pose calculation step of calculating, in accordance with the shape feature vector extracted by the feature extraction step, a three dimensional pose of the half-body, by utilizing a feature mapping matrix corresponding to the half-body.

According to another aspect of the invention, there is also provided a three dimensional human pose recognition method, including steps of: a three dimensional pose initial recognition step of performing three dimensional pose recognition on an input image containing a human image to obtain image-based three dimensional human pose information; a sensor information acquisition step of acquiring, by a motion sensor, motion information of human articulation points; and a three dimensional pose correction step of correcting, with the motion information acquired by the sensor information acquisition step, the image-based three dimensional human pose information recognized by the three dimensional pose initial recognition step.

According to another aspect of the invention, there is also provided a three dimensional human pose recognition apparatus, including: a half-body area determination unit configured to determine, from an input image containing a human image, an image area of a half-body which is a left half portion or a right half portion of a human body; a feature extraction unit configured to extract, from the image area of the half-body determined by the half-body area determination unit, a shape feature vector; and a three dimensional half-body pose calculation unit configured to calculate, in accordance with the shape feature vector extracted by the feature extraction unit, a three dimensional pose of the half-body, by utilizing a feature mapping matrix corresponding to the half-body.

According to another aspect of the invention, there is also provided a three dimensional human pose recognition apparatus, including: a three dimensional pose initial recognition unit configured to perform three dimensional pose recognition on an input image containing a human image to obtain image-based three dimensional human pose information; a sensor information acquisition unit configured to acquire, by a motion sensor, motion information of human articulation points; and a three dimensional pose correction unit configured to correct, with the motion information acquired by the sensor information acquisition unit, the image-based three dimensional human pose information recognized by the three dimensional pose initial recognition unit.

According to still another aspect of the invention, there is also provided a computer program product for realizing the three dimensional human pose recognition method described above.

According to yet another aspect of the invention, there is also provided a computer readable medium, on which computer program codes for implementing the three dimensional human pose recognition method described above are recorded.

According to the aforementioned technical solutions of the invention, accuracy and/or speed of the three dimensional human pose recognition can be improved efficiently and significantly.

BRIEF DESCRIPTION OF THE DRAWINGS

The invention can be better understood with reference to the detailed description given below in conjunction with the accompanying drawings, throughout which identical or like reference signs denote identical or like components and together with which the following detailed description is incorporated into and forms a part of the specification and serves to further illustrate the preferred embodiments of the invention and to explain the principle and advantages of the invention. In the drawings.

Figure 1:
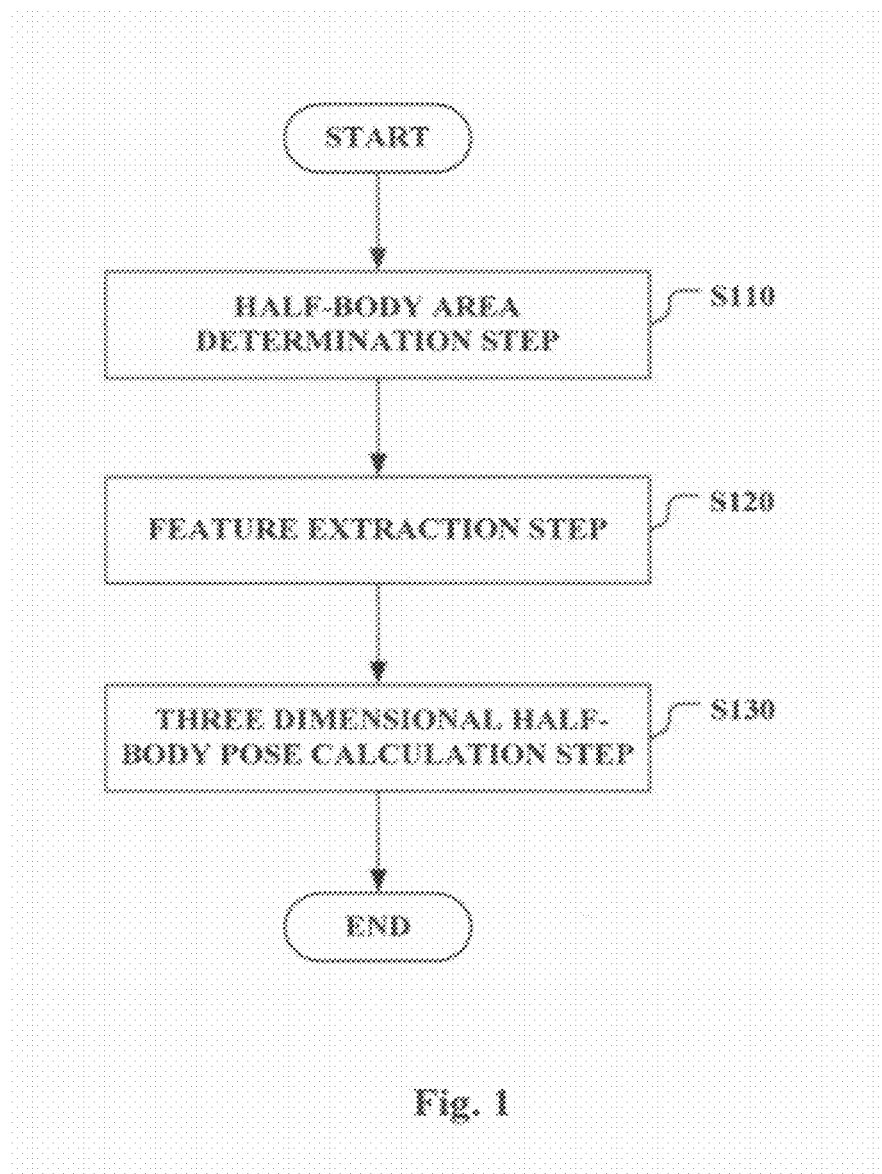
FIG. 1 is an overall flow chart illustrating a three dimensional human pose recognition method according to an embodiment of the invention.

Those skilled in the art shall appreciate that the elements in the drawings are illustrated merely for the purpose of simplicity and clarity, but not necessarily drawn to scale. For example, the size of some elements in the drawing may be scaled up relative to other elements so as to improve understanding of the embodiments of the invention.

DETAILED DESCRIPTION OF THE INVENTION

Exemplary embodiments of the present invention will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the invention are illustrated in the drawings while other details less relevant to the invention are omitted so as not to obscure the invention due to those unnecessary details.

First, a three dimensional human pose recognition method according to an embodiment of the invention will be described in detail with reference to the accompanying drawings.

FIG. 1 is an overall flow chart illustrating a three dimensional human pose recognition method according to an embodiment of the invention. As shown in FIG. 1, the three dimensional human pose recognition method according to the embodiment of the invention includes: a half-body area determination step S110, a feature extraction step S120 and a three dimensional half-body pose calculation step S130.

First, in the half-body area determination step S110, an image area of a half-body is determined from an input image containing a human image, where the half-body may be a left half portion or a right half portion of a human body.

Figure 2:
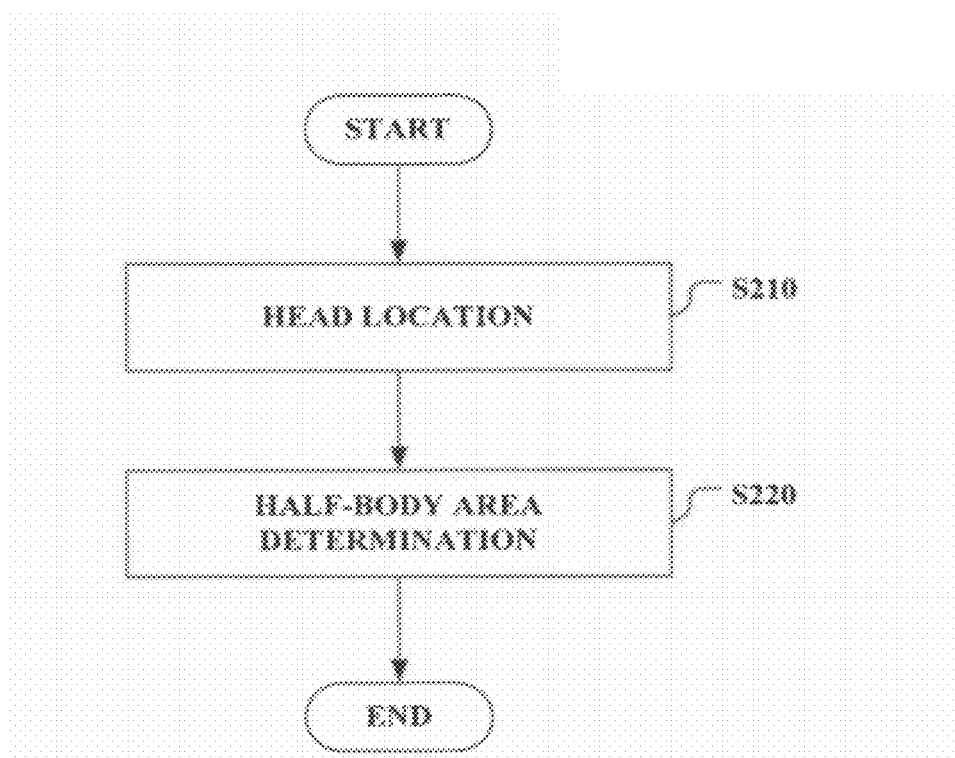
FIG. 2 is a flow chart illustrating specifically the processes in the half-body area determination step illustrated in FIG. 1.

In a preferable embodiment, a position of a head may be located firstly, the image area of the half-body is then estimated according to the proportional relationship between the head and the human body. FIG. 2 is a flow chart illustrating specifically the processes in the half-body area determination step S110. However, those skilled in the art shall appreciate that the invention is not limited to the following implementation.

As shown in FIG. 2, in step S210, a position of a head of the human body is located from the input image. Specifically, a current frame of the image $I^t$ is acquired from, for example, a camera or an image sensor, where t is the number of frames in time sequence, then the position of the head is located. Here, head location may be a result of head detection or a result of human face detection. The result of head location is a rectangle (x,y,w,h), where x, y is a coordinate of the upper left corner in the image, and w, h are width and height of the rectangle. Here, a specific implementation of head location may be found in Xu, X. and Li, B., "Head Tracking Using Particle Filter with Intensity Gradient and Color Histogram" (IEEE International Conference on Multimedia and Expo, pp. 888-891, 2005) and Yi Sun, Yan Wang and Yinghao He, "Head-and-Shoulder Detection in Varying Pose" (International Conference on Natural Computation, pp. 12-20, 2005).

Next, in step S220, the image area of the half-body is determined in accordance with the position of the head. Specifically, it is assumed that a rectangle of the human image in the input image is (ROI_X, ROI_Y, ROI_W, ROI_H) where ROI_X ROI_Y is a coordinate of the upper left corner of the rectangle in the image, and ROI_W, ROI_H are width and height of the rectangle, which satisfy the following constraint relationship:

$$ROI\_W = m*w$$

$$ROI\_H = n*h$$

$$ROI\_X = x - ((m-1)*w/2)$$

$$ROI\_Y = y - (ROI\_H - p*h)$$

The values of m, n, p are obtained from statistics of body proportions of various human bodies, and in an embodiment, m=6.67, n=5, p=3.5.

For example, according to a selection of the user, if the pose of the left half portion of the human body is to be estimated, then $$ROI\_X\_L = ROI\_X$$

$$ROI\_Y\_L = ROI\_Y$$

$$ROI\_W\_L = ROI\_W/2$$

$$ROI\_H\_L = ROI\_H$$

And if the pose of the right half portion of the human body is to be estimated, then $$ROI\_X\_R = ROI\_X + ROI\_W/2$$

$$ROI\_Y\_R = ROI\_Y$$

$$ROI\_W\_R = ROI\_W/2$$

$$ROI\_H\_R = ROI\_H$$

Figure 3:
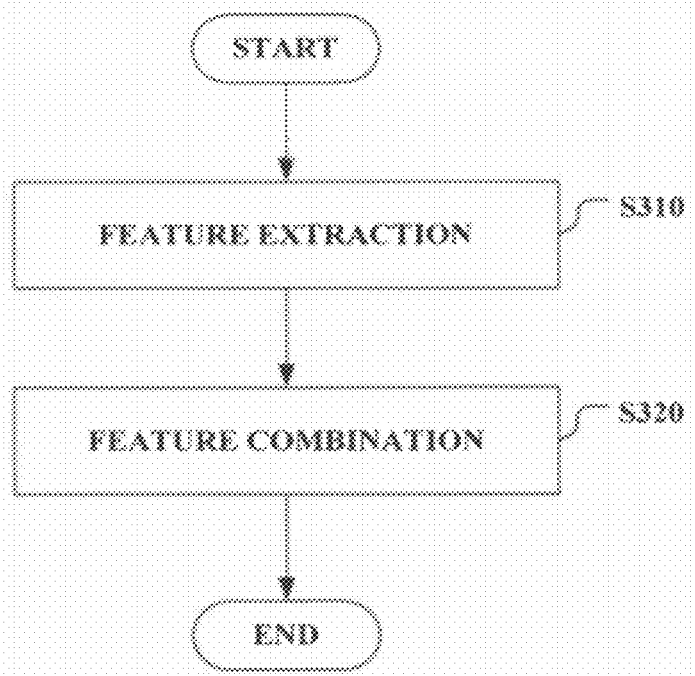
FIG. 3 is a flow chart illustrating specifically the processes in the feature extraction step illustrated in FIG. 1.

Return to FIG. 1, next, in the feature extraction step S120, a shape feature vector is extracted from the image area of the half-body determined by the half-body area determination step S110. FIG. 3 is a flow chart illustrating specifically the processes in the feature extraction step S120. However, those skilled in the art shall appreciate that the invention is not limited to the following implementation.

As shown in FIG. 3, firstly in the step S310, the image area of the half-body is scanned with a scan window of a predetermined size so as to extract a shape feature from each scan window. Then, in the step S320, the shape features extracted from each scan window are combined to obtain the shape feature vector.

Specifically, it is assumed that the size of the scan window is (Block_W, Block_H), a horizontal step of scanning is Block_W/2 and a vertical step of scanning is Block_H/2, and in the case that the pose of the left half portion of the human body is to be estimated, the number of the scan windows is N=[2*ROI_W_L/Block_W]×[2*ROI_H_L/Block_H], or in the case that the pose of the right half portion of the human body is to be estimated, the number of the scan windows is N=[2*ROI_W_R/Block_W]×[2*ROI_H_R/Block_H], thereby obtaining a scan window sequence: W={$w_i$, i=1, 2, . . . , N}. The shape features extracted from each scan window represented as $v_i$ are combined (for example, connected sequentially) to obtain the shape feature vector V: V=[$v_1$ $v_2$ . . . $v_N$]. Here, the shape feature may be a Histogram of Oriented Gradient (HOG) feature or a Scale-invariant feature transform (SIFT) feature. Details of the HOG feature may be found in, for example, Navneet Dalal and Bill Triggs, "Histograms of Oriented Gradients for Human Detection" (IEEE Computer Society Conference on Computer Vision and Pattern Recognition, pp. 886-893, 2005), and details of the SIFT feature may be found in, for example, D. Lowe, "Distinctive Image Features from Scale-invariant Keypoints" (International Journal of Computer Vision, 60, 2:91-110, 2004).

Return again to FIG. 1, finally, in the three dimensional half-body pose calculation step S130, a three dimensional pose of the half-body is calculated by utilizing a feature mapping matrix corresponding to the half-body in accordance with the shape feature vector extracted by the feature extraction step S120.

Specifically, for example, based on a user selection, if the pose of the left half portion of the human body is to be estimated, then the three dimensional pose of the left half portion of the human body $Y_L$ is calculated by utilizing a feature mapping matrix corresponding to the left half portion of the human body $Map_L$. The calculation formula is:

$$Y_L = Map_L * V_L = [x_1, y_1, z_1, x_2, y_2, z_2, \ldots, x_{n_L}, y_{n_L}, z_{n_L}]$$

Where $n_L$ is the number of the human articulation points, in an example, $n_L$=5, and the 5 human articulation points are waist, head, left shoulder, left elbow and left wrist, respectively. Here, the feature mapping matrix $Map_L$ is obtained in advance from training and learning of pictures of the human poses and information on the three dimensional human poses.

Alternatively, for example, based on a user selection, if the pose of the right half portion of the human body is to be estimated, then the three dimensional pose of the right half portion of the human body $Y_R$ is calculated by utilizing a feature mapping matrix corresponding to the right half portion of the human body $Map_R$. The calculation formula is:

$$Y_R = Map_R * V_R = [x_1, y_1, z_1, x_2, y_2, z_2, \ldots, x_{n_R}, y_{n_R}, z_{n_R}]$$

Where $n_R$ is the number of the human articulation points, in an example, $n_R$=5, and the 5 human articulation points are waist, head, right shoulder, right elbow and right wrist, respectively. Here, the feature mapping matrix $Map_R$ is obtained in advance from training and learning of pictures of the human poses and information on the three dimensional human poses.

Here, more details of the feature mapping matrix may be found in, for example, A. Agarwal and B. Triggs, "Regression based approach", section 2 in "A Local Basis Representation for Estimation Human Pose from Cluttered Images" (ACCV 2006).

Optionally, the three dimensional human pose recognition method according to the embodiment of the invention further includes a three dimensional half-body pose combination step (not shown), where three dimensional pose recognition results of the left half and right half portions of the human body are combined to obtain a three dimensional pose of the whole human body.

According to the technical solution of the invention described above, speed of three dimensional human pose recognition can be improved significantly while improving accuracy of the three dimensional human pose recognition.

Hereinafter, a three dimensional human pose recognition method according to another embodiment of the invention will be described in detail with reference to the accompanying drawings.

Figure 4:
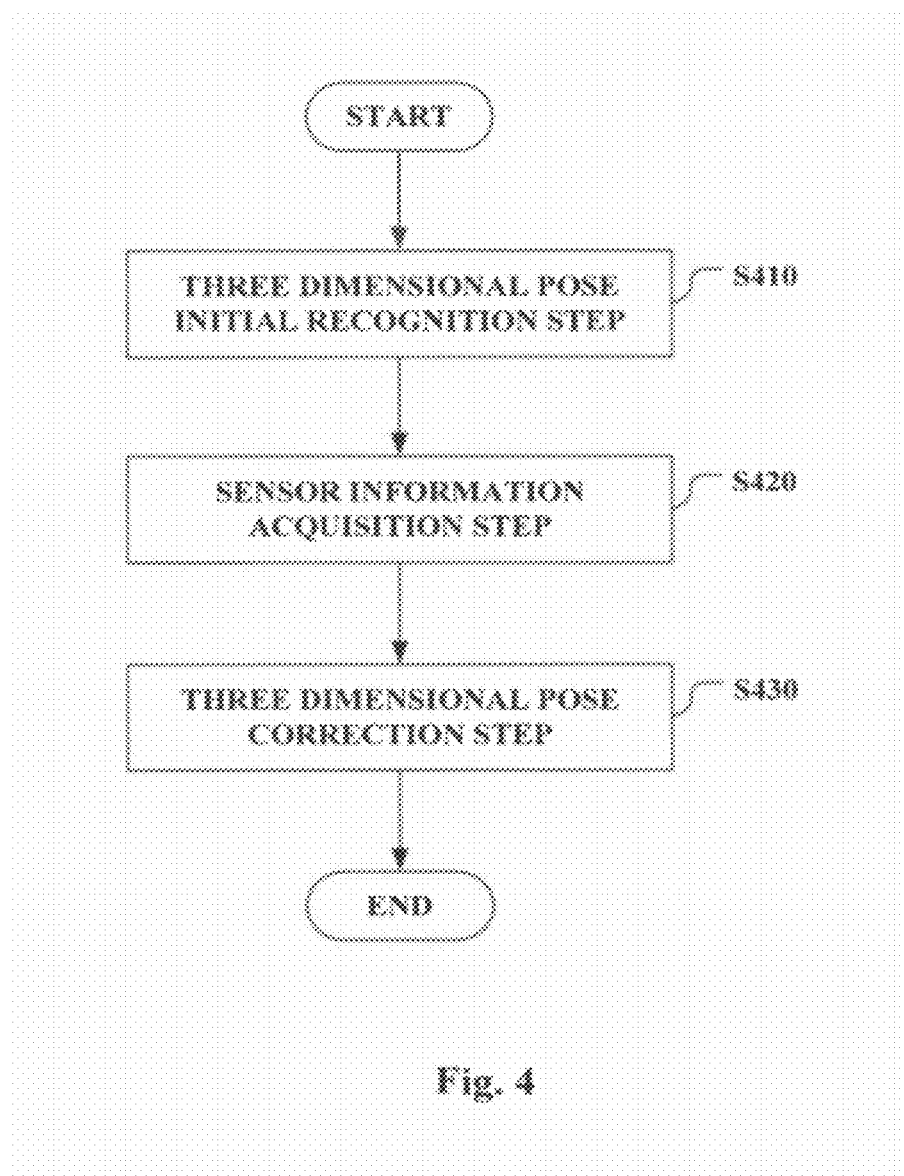
FIG. 4 is an overall flow chart illustrating a three dimensional human pose recognition method according to another embodiment of the invention.

FIG. 4 is an overall flow chart illustrating a three dimensional human pose recognition method according to another embodiment of the invention. As shown in FIG. 4, the three dimensional human pose recognition method according to another embodiment of the invention includes: a three dimensional pose initial recognition step S410, a sensor information acquisition step S420 and a three dimensional pose correction step S430.

First, in the three dimensional pose initial recognition step S410, three dimensional pose recognition is performed on an input image containing a human image to obtain image-based three dimensional human pose information.

Here, the input image containing the human image may be acquired from, for example, a camera or an image sensor, where a current frame of the image is represented as $I^t$, and t is the number of frames in time sequence.

Further, the three dimensional pose recognition processes in the three dimensional pose initial recognition step S410 may be realized with various three dimensional pose recognition techniques in the prior art (for example, refer to the non-patent literatures 1-7 and patent literature 1 mentioned above). Preferably, the three dimensional pose recognition processes in the three dimensional pose initial recognition step S410 may be realized according to the three dimensional pose recognition method described hereinabove with reference to FIGS. 1-3.

Next, in the sensor information acquisition step S420, motion information of the human articulation points is acquired by a motion sensor.

Specifically, motion information of the human articulation points $(\Delta^t_x, \Delta^t_y, \Delta^t_z)$ of the current frame $I^t$ relative to the previous $I^{t-1}$ frame may be acquired directly from the motion sensor, where $\Delta^t_x$, $\Delta^t_y$, $\Delta^t_z$ represent displacement values of the motion sensor in a horizontal direction, a vertical direction and a depth direction, respectively.

Finally, in the three dimensional pose correction step S430, the image-based three dimensional human pose information recognized by the three dimensional pose initial recognition step S410 is corrected with the motion information acquired by the sensor information acquisition step S420.

Figure 5:
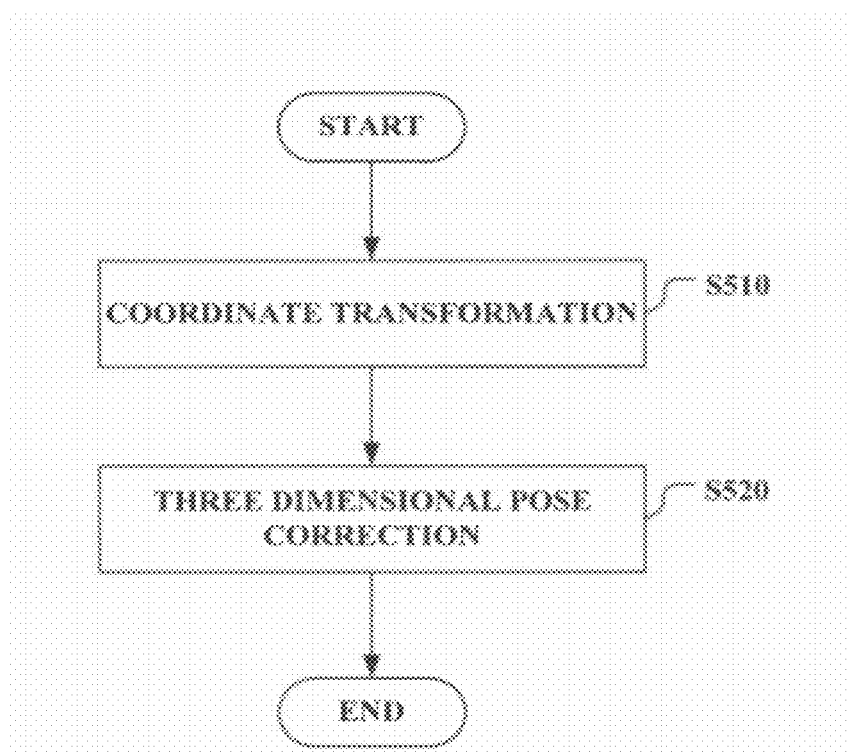
FIG. 5 is a flow chart illustrating specifically the processes in the three dimensional pose correction step illustrated in FIG. 4.

FIG. 5 is a flow chart illustrating specifically processes in the three dimensional pose correction step S430. However, those skilled in the art shall appreciate that the invention is not limited to the following implementation.

As shown in FIG. 5, first in the step S510, a coordinate difference in a coordinate system in which the image-based three dimensional human pose information lies is transformed from the motion information of the human articulation points. Specifically, a coordinate difference $(\Delta x^t, \Delta y^t, \Delta z^t)$ in a coordinate system in which the three dimensional pose Y lies is transformed from the motion information $(\Delta^t_x, \Delta^t_y, \Delta^t_z)$. The transformation formula is: $\Delta x^t = \Delta^t_x/s, \Delta y^t = \Delta^t_y/s, \Delta z^t = \Delta^t_z/s$, where s is a scaling factor between the two coordinate systems.

Next, in the step S520, the image-based three dimensional human pose information is corrected in accordance with the coordinate difference transformed in the step S510. Here, a three dimensional human pose may be corrected in different manners according to the specific design. Two specific examples will be presented hereinafter, however, it is apparent that the invention is not limited to these examples.

Example 1

It is assumed that a motion sensor is set on a human articulation point m, the coordinate of the human articulation point m of the current frame t is $(x_m^t, y_m^t, z_m^t)$, and the coordinate of the human articulation point m of the previous frame t−1 is $(x_m^{t-1}, y_m^{t-1}, z_m^{t-1})$, then the formulas for calculating the corrected coordinate of the human articulation point m $(x'^t_m, y'^t_m, z'^t_m)$ are as follows:

$$x'^t_m = x_m^{t-1} + \alpha*(x_m^t - x_m^{t-1}) + \beta*\Delta x^t$$

$$y'^t_m = y_m^{t-1} + \alpha*(y_m^t - y_m^{t-1}) + \beta*\Delta y^t$$

$$z'^t_m = z_m^{t-1} + \alpha*(z_m^t - z_m^{t-1}) + \beta*\Delta z^t, \text{ where } \alpha + \beta = 1.$$

Example 2

It is assumed that a motion sensor is set on a human articulation point m, the coordinate of the human articulation point m of the current frame t is $(x_m^t, y_m^t, z_m^t)$, and the coordinates of the human articulation point m of the previous K frames sequentially are:
$(x_m^{t-1}, y_m^{t-1}, z_m^{t-1}), (x_m^{t-2}, y_m^{t-2}, z_m^{t-2}), \ldots, (x_m^{t-K}, y_m^{t-K}, z_m^{t-K})$
the motion information of the current frame t relative to the previous K frames sequentially is:
$(\Delta^t_x, \Delta^t_y, \Delta^t_z), (\Delta^{t-1}_x, \Delta^{t-1}_y, \Delta^{t-1}_z), (\Delta^{t-2}_x, \Delta^{t-2}_y, \Delta^{t-2}_z), \ldots (\Delta^{t-K+1}_x, \Delta^{t-K+1}_y, \Delta^{t-K+1}_z)$,
then the formulas for calculating the corrected coordinate of the human articulation point $(x'^t_m, y'^t_m, z'^t_m)$ are as follows:

$$x'^t_m = \sum_{i=1}^{K} \omega_i * (x_m^{t-i} + \alpha*(x_m^t - x_m^{t-i}) + \beta*\Delta x^{t-i+1}),$$

$$\text{where } \alpha + \beta = 1, \sum_{i=1}^{K} \omega_i = 1$$

Figure 6:
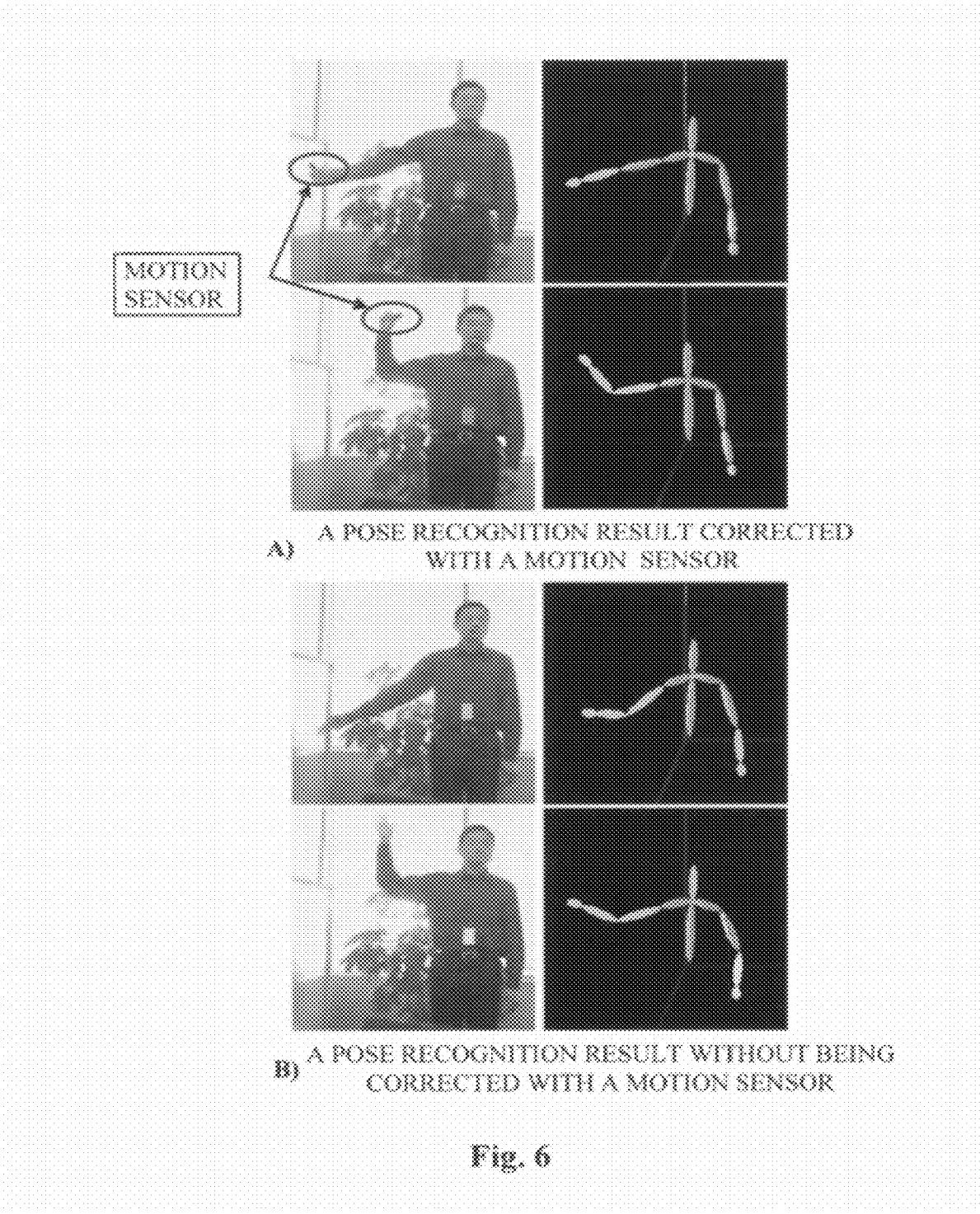
FIG. 6 illustrates an exemplary comparison diagram between a pose recognition result corrected with a motion sensor and a pose recognition result without being corrected with a motion sensor.

FIG. 6 illustrates an exemplary comparison diagram between a pose recognition result corrected with a motion sensor and a pose recognition result without being corrected with a motion sensor. It can be seen from FIG. 6 that accuracy of the three dimensional human pose recognition may be improved efficiently according to the technical solution of the embodiments of the invention described above.

The three dimensional human pose recognition method according to the embodiments of the invention has been described in detail hereinabove in conjunction with the accompanying drawings, and a three dimensional human pose recognition apparatus according to the embodiments of the invention will be described in detail hereinafter in conjunction with the accompanying drawings.

Figure 7:
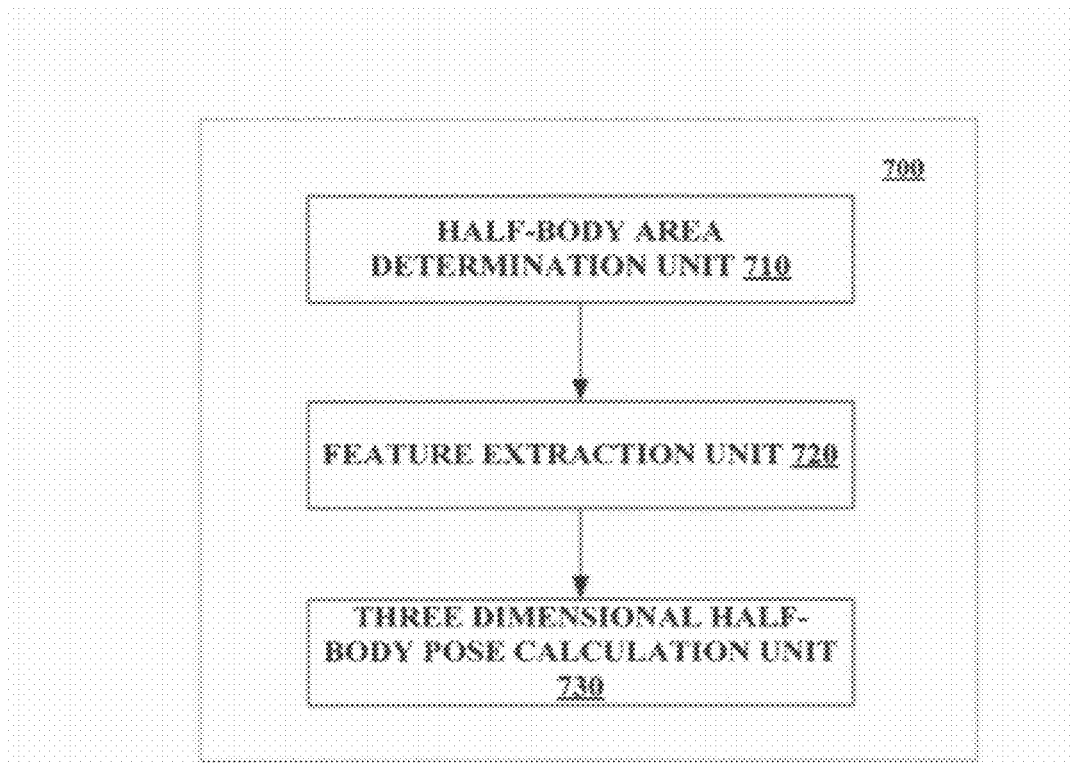
FIG. 7 is a block diagram illustrating a structure of a three dimensional human pose recognition apparatus according to an embodiment of the invention.

FIG. 7 is a block diagram illustrating a structure of a three dimensional human pose recognition apparatus 700 according to an embodiment of the invention, in which only those parts closely relevant to the invention are shown for the sake of conciseness. The three dimensional human pose recognition method described above with reference to FIG. 1 may be carried out in the three dimensional human pose recognition apparatus 700.

As shown in FIG. 7, the three dimensional human pose recognition apparatus 700 may include: a half-body area determination unit 710 configured to determine, from an input image containing a human image, an image area of a half-body which is a left half portion or a right half portion of a human body; a feature extraction unit 720 configured to extract, from the image area of the half-body determined by the half-body area determination unit 710, a shape feature vector; and a three dimensional half-body pose calculation unit 730 configured to calculate, in accordance with the shape feature vector extracted by the feature extraction unit 720, a three dimensional pose of the half-body, by utilizing a feature mapping matrix corresponding to the half-body.

Figure 8:
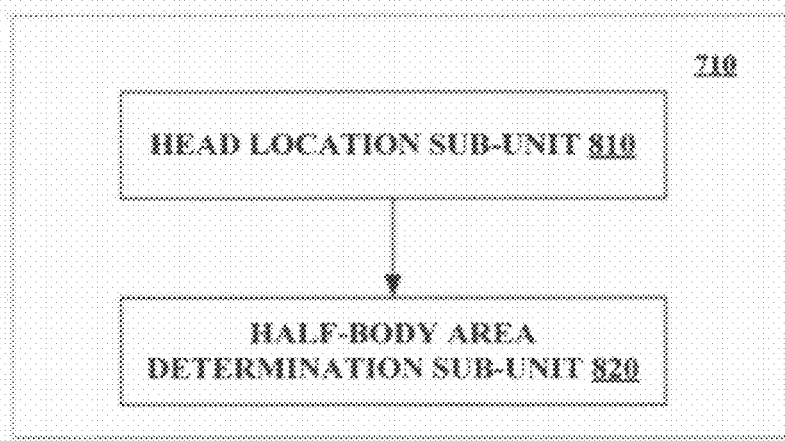
FIG. 8 is a block diagram illustrating specifically a structure of the half-body area determination unit illustrated in FIG. 7.

FIG. 8 is a block diagram illustrating specifically a structure of the half-body area determination unit 710 illustrated in FIG. 7. As shown in FIG. 8, the half-body area determination unit 710 further includes: a head location sub-unit 810 configured to locate, from the input image, a position of a head of the human body; and a half-body area determination sub-unit 820 configured to determine, in accordance with the position of the head, the image area of the half-body.

Figure 9:
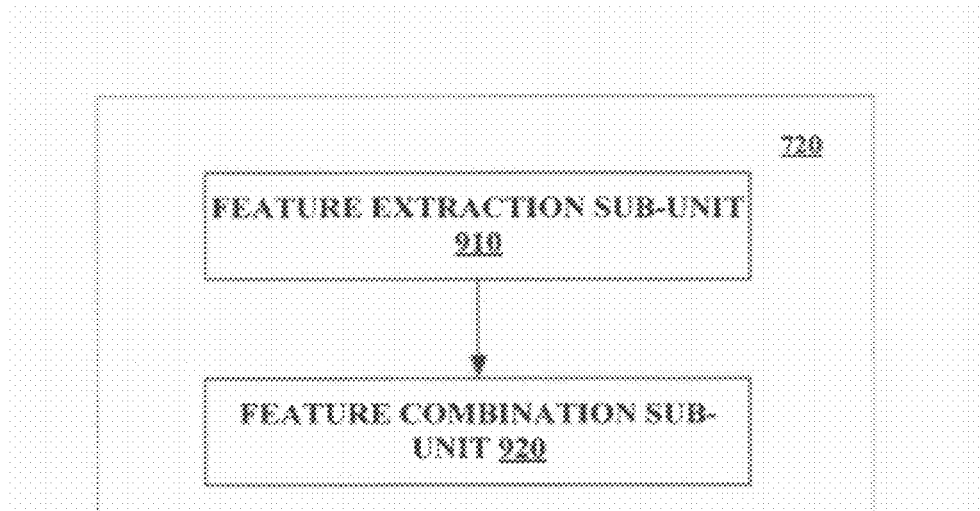
FIG. 9 is a block diagram illustrating specifically a structure of the feature extraction unit illustrated in FIG. 7.

FIG. 9 is a block diagram illustrating specifically a structure of the feature extraction unit 720 illustrated in FIG. 7. As shown in FIG. 9, the feature extraction unit 720 further includes: a feature extraction sub-unit 910 configured to scan, with a scan window of a predetermined size, the image area of the half-body, so as to extract a shape feature from each scan window; and a feature combination sub-unit 920 configured to combine the shape feature extracted from each scan window to obtain the shape feature vector. Preferably, the shape feature may be a Histogram of Oriented Gradient (HOG) feature or a Scale Invariant Feature Transform (SIFT) feature.

Optionally, the three dimensional human pose recognition apparatus 700 may further include: a three dimensional half-body pose combination unit (not shown) configured to combine three dimensional pose recognition results of the left half and right half portions of the human body to obtain a three dimensional pose of the whole human body.

How to implement the functions of the respective component units of the three dimensional human pose recognition apparatus 700 has become rather clear through reading of the description of the corresponding processes presented hereinabove, thus the details thereof are omitted herein.

It shall be noted that the structures of the three dimensional human pose recognition apparatus 700 and the component units thereof shown in FIGS. 7-9 are merely exemplary, which may be modified by those skilled in the art as required.

Figure 10:
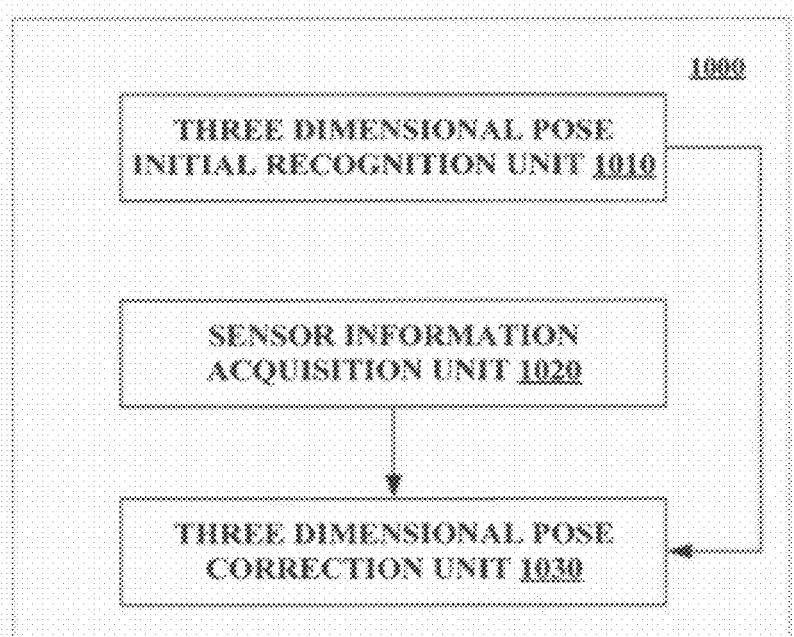
FIG. 10 is a block diagram illustrating a structure of a three dimensional human pose recognition apparatus according to another embodiment of the invention.

FIG. 10 is a block diagram illustrating a structure of a three dimensional human pose recognition apparatus 1000 according to another embodiment of the invention, in which only those parts closely relevant to the invention is shown for the sake of conciseness. The three dimensional human pose recognition method described above with reference to FIG. 4 may be carried out in the three dimensional human pose recognition apparatus 1000.

As shown in FIG. 10, the three dimensional human pose recognition apparatus 1000 may include: a three dimensional pose initial recognition unit 1010 configured to perform three dimensional pose recognition on an input image containing a human image to obtain image-based three dimensional human pose information; a sensor information acquisition unit 1020 configured to acquire, by a motion sensor, motion information of human articulation points; and a three dimensional pose correction unit 1030 configured to correct, with the motion information acquired by the sensor information acquisition unit 1020, the image-based three dimensional human pose information recognized by the three dimensional pose initial recognition unit 1010.

Preferably, the three dimensional pose initial recognition unit 1010 may be composed of the three dimensional human pose recognition apparatus 700.

Figure 11:
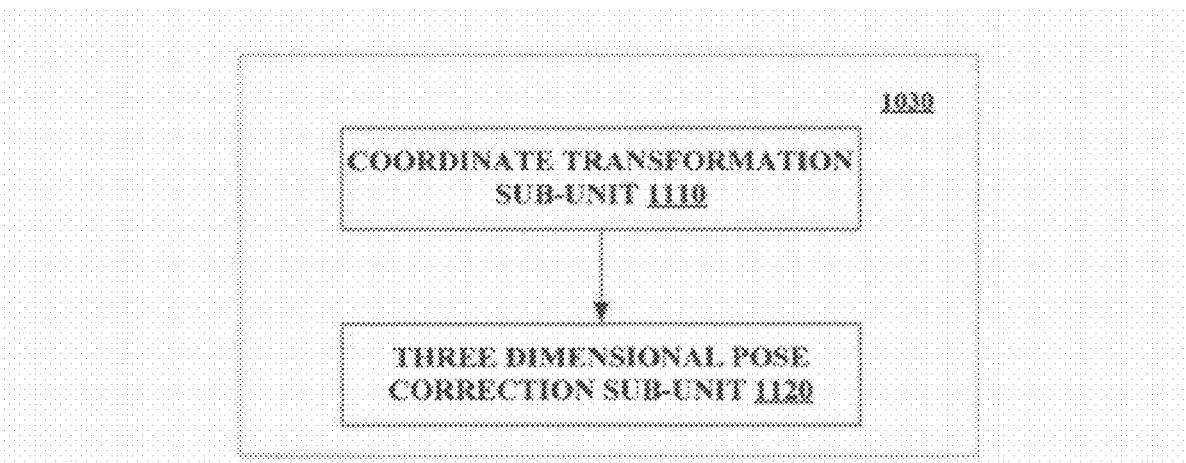
FIG. 11 is a block diagram illustrating specifically a structure of the three dimensional pose correction unit illustrated in FIG. 10.

FIG. 11 is a block diagram illustrating specifically a structure of the three dimensional pose correction unit 1030 illustrated in FIG. 10. As shown in FIG. 11, the three dimensional pose correction unit 1030 further includes: a coordinate transformation sub-unit 1110 configured to transform the motion information into a coordinate difference in a coordinate system in which the image-based three dimensional human pose information lies; and a three dimensional pose correction sub-unit 1120 configured to correct, in accordance with the coordinate difference, the image-based three dimensional human pose information.

How to implement the functions of the respective component units of the three dimensional human pose recognition apparatus 1000 has become rather clear through reading of the description of the corresponding processes presented hereinabove, thus the details thereof are omitted herein.

It shall be noted that the structures of the three dimensional human pose recognition apparatus 1000 and the component units thereof shown in FIGS. 10-11 are merely exemplary, which may be modified by those skilled in the art as required.

The basic principles of the invention have been described in combination with the specific embodiments hereinabove, however, it shall be noted that those skilled in the art may understand that all or any steps or components of the method and apparatus of the invention may be implemented by hardware, firmware, software or combinations thereof in any computing apparatus (including a processor, a storage medium and the like) or a network of computing apparatuses, which can be realized by those skilled in the art by utilizing their basic programming skills after reading the description of the invention.

Therefore, the object of the invention may also be achieved by running a program or a set of programs on any computing apparatuses. The computing apparatuses may be well-known general-purpose apparatuses. Therefore, the object of the invention may also be achieved simply by providing a program product containing program codes implementing the method or apparatus. That is, such a program product constitutes the invention, and a storage medium storing such a program product also constitutes the invention. Obviously, the storage medium may be any well-known storage medium or any storage medium to be developed in the future.

Figure 12:
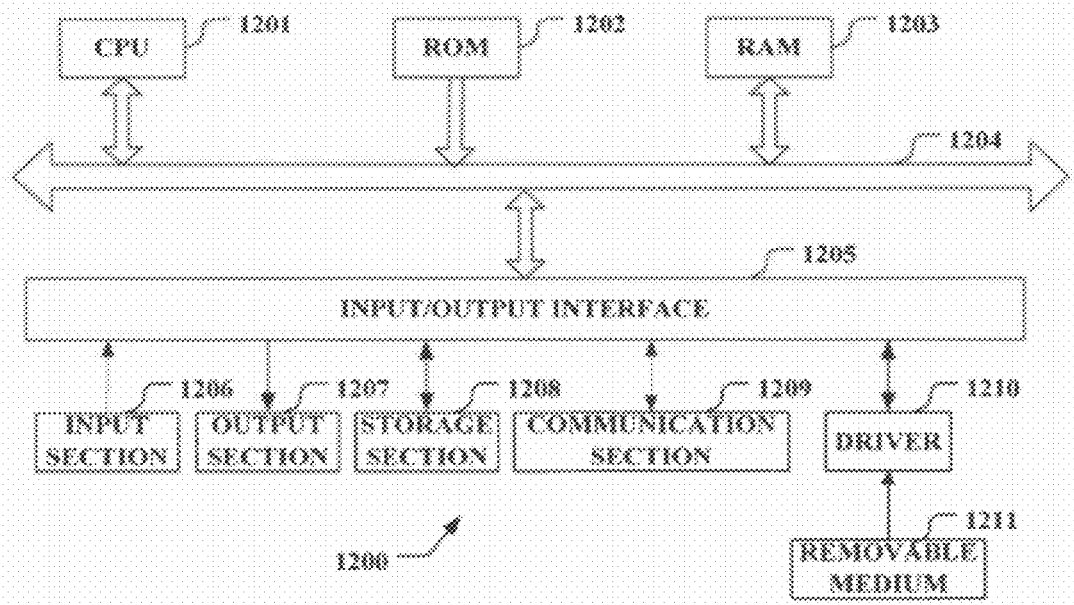
FIG. 12 is an exemplary block diagram of a structure of a computer in which the invention is embodied.

In a case that the embodiments of the invention are implemented by software and/or firmware, programs constituting the software are installed from a storage medium or a network into a computer with a dedicated hardware structure, for example, a general-purpose computer 1200 illustrated in FIG. 12, which can carry out various functions and the like when installed with various programs.

In FIG. 12, a central processing unit (CPU) 1201 executes various processes in accordance with a program stored in a read only memory (ROM) 1202 or a program loaded from a storage section 1208 to a random access memory (RAM) 1203. Data required for the CPU 1201 to execute various processes and the like is also stored in the RAM 1203 as required. The CPU 1201, the ROM 1202 and the RAM 1203 are connected to one another via a bus 1204. An input/output interface 1205 is also connected to the bus 1204.

The following components are connected to the input/output interface 1205: an input section 1206 including a keyboard, a mouse, and the like; an output section 1207 including a display such as a cathode ray tube (CRT), a liquid crystal display (LCD), and the like, a speaker and the like; the storage section 1208 including a hard disk or the like; and a communication section 1209 including a network interface card such as a LAN card, a modem, and the like. The communication section 1209 performs communication via the network such as Internet.

A driver 1210 is also connected to the input/output interface 1205 as required. A removable medium 1211, such as a magnetic disk, an optical disk, a magneto optical disk, a semiconductor memory, or the like, is mounted on the driver 1210 as required, so that a computer program read therefrom is installed into the storage section 1208 as required.

In a case that the above-described series of processes are implemented by the software, the program that constitutes the software is installed from the network such as the Internet or the storage medium such as the removable medium 1211.

Those skilled in the art should understand that this storage medium is not limited to the removable medium 1211 in which a program is stored and which is distributed separately from the apparatus so as to provide the program to the user as shown in FIG. 12. Examples of the removable medium 1211 include the magnetic disk (including floppy disk (registered trade mark)), the optical disk (including compact disk-read only memory (CD-ROM) and digital versatile disk (DVD)), the magneto optical disk (including mini disk (MD) (registered trade mark)) and the semiconductor memory. Alternatively, the storage medium may be the ROM 1202, the hard disk contained in the storage section 1208 or the like, in which a program is stored and which is distributed to the user together with the apparatus containing it.

It shall also be noted that obviously each component or each step may be decomposed and/or recombined in the apparatus and method of the present invention. These decompositions and/or re-combinations shall be considered as equivalent schemes of the present invention. Also, the steps of performing the above series of processes may be naturally performed chronologically in an order of description but not necessarily. Some steps may be performed in parallel or independently from one another.

Although the invention and advantages thereof have been described in detail herein, it shall be understood that various changes, replacements and modifications may be made by one skilled in the art without departing from the spirit and scope of the invention. Furthermore, the terms "comprise", "include" or any other variation thereof are intended to cover a non-exclusive inclusion, so that a process, method, article, or apparatus that comprises a list of elements includes not only those elements but also other elements not explicitly listed or inherent to such process, method, article, or apparatus. Unless further defined, a sentence "comprises a/an . . . " which defines an element does not preclude the existence of additional identical element(s) in the process, method, article, or apparatus that comprises the element.

What is claimed is:

1. A three dimensional human pose recognition method, comprising steps of:
    a half-body area determination step of determining, from an input image containing a human image, an image area of a half-body which is a left half portion or a right half portion of a human body;
    a feature extraction step of extracting, from the image area of the half-body determined by the half-body area determination step, a shape feature vector;
    a three dimensional half-body pose calculation step of calculating, in accordance with the shape feature vector extracted by the feature extraction step, a three dimensional pose of the half-body, by utilizing a feature mapping matrix corresponding to the half-body; and
    a three dimensional half-body pose combination step of combining three dimensional pose recognition results of the left half and right half portions of the human body to obtain a three dimensional pose of the whole human body.

2. The three dimensional human pose recognition method as claimed in claim 1, wherein the half-body area determination step further comprises sub-steps of:
    a head location sub-step of locating, from the input image, a position of a head of the human body; and
    a half-body area determination sub-step of determining, in accordance with the position of the head, the image area of the half-body.

3. The three dimensional human pose recognition method as claimed in claim 1, wherein the feature extraction step further comprises sub-steps of:
    a feature extraction sub-step of scanning, with a scan window of a predetermined size, the image area of the half-body, so as to extract a shape feature from each scan window; and
    a feature combination sub-step of combining the shape feature extracted from each scan window to obtain the shape feature vector.

4. The three dimensional human pose recognition method as claimed in claim 3, wherein the shape feature is a Histogram of Oriented Gradient, HOG, feature or a Scale Invariant Feature Transform, SIFT, feature.

5. A three dimensional human pose recognition method, comprising steps of:
    a three dimensional pose initial recognition step of performing three dimensional pose recognition on an input image containing a human image to obtain image-based three dimensional human pose information;
    a sensor information acquisition step of acquiring, by a motion sensor, motion information of human articulation points; and
    a three dimensional pose correction step of correcting, with the motion information acquired by the sensor information acquisition step, the image-based three dimensional human pose information recognized by the three dimensional pose initial recognition step, wherein
    the three dimensional pose initial recognition step further comprises:
        a half-body area determination sub-step of determining, from the input image, an image area of a half-body which is a left half portion or a right half portion of a human body;
        a feature extraction sub-step of extracting, from the image area of the half-body determined by the half-body area determination sub-step, a shape feature vector;
        a three dimensional half-body pose calculation sub-step of calculating, in accordance with the shape feature vector extracted by the feature extraction sub-step, a three dimensional pose of the half-body, by utilizing a feature mapping matrix corresponding to the half-body; and
        a three dimensional half-body pose combination sub-step of combining three dimensional pose recognition results of the left half and right half portions of the human body to obtain the image-based three dimensional pose information of the whole human body.

6. The three dimensional human pose recognition method as claimed in claim 5, wherein the three dimensional pose correction step further comprises:
    a coordinate transformation sub-step of transforming the motion information into a coordinate difference in a coordinate system in which the image-based three dimensional human pose information lies; and a three dimensional pose correction sub-step of correcting, in accordance with the coordinate difference, the image-based three dimensional human pose information.

7. A three dimensional human pose recognition apparatus, comprising:
   circuitry configured to
   determine, from an input image containing a human image, an image area of a half-body which is a left half portion or a right half portion of the human body;
   extract, from the image area of the half-body, a shape feature vector;
   calculate, in accordance with the shape feature vector, a three dimensional pose of the half-body, by utilizing a feature mapping matrix corresponding to the half-body; and
   combine three dimensional pose recognition results of the left half and right half portions of the human body to obtain a three dimensional pose of the whole human body.

8. The three dimensional human pose recognition apparatus as claimed in claim 7, wherein the circuitry is further configured to:
   locate, from the input image, a position of a head of the human body; and
   determine, in accordance with the position of the head, the image area of the half-body.

9. The three dimensional human pose recognition apparatus as claimed in claim 7, wherein the circuitry is further configured to:
   scan, with a scan window of a predetermined size, the image area of the half-body, so as to extract a shape feature from each scan window; and
   combine the shape feature extracted from each scan window to obtain the shape feature vector.

10. The three dimensional human pose recognition apparatus as claimed in claim 9, wherein the shape feature is a Histogram of Oriented Gradient, HOG, feature or a Scale Invariant Feature Transform, SIFT, feature.

11. A three dimensional human pose recognition apparatus, comprising:
    circuitry configured to
    determine, from an input image containing a human image, an image area of a half-body which is a left half portion or a right half portion of the human body;
    extract, from the image area of the half-body, a shape feature vector;
    calculate, in accordance with the shape feature vector, a three dimensional pose of the half-body, by utilizing a feature mapping matrix corresponding to the half-body;
    combine three dimensional pose recognition results of the left half and right half portions of the human body to obtain a three dimensional pose of the whole human body as image-based three dimensional human pose information;
    acquire, by a motion sensor, motion information of human articulation points; and
    correct, with the motion information, the image-based three dimensional human pose information.

12. The three dimensional human pose recognition apparatus as claimed in claim 11, wherein the circuitry is further configured to:
    transform the motion information into a coordinate difference in a coordinate system in which the image-based three dimensional human pose information lies; and
    correct, in accordance with the coordinate difference, the image-based three dimensional human pose information.

13. A non-transitory computer-readable medium including machine readable instruction codes stored thereon, which when being read and executed by a machine performs a three dimensional human pose recognition method, wherein the three dimensional human pose recognition method comprises steps of:
    a half-body area determination step of determining, from an input image containing a human image, an image area of a half-body which is a left half portion or a right half portion of a human body;
    a feature extraction step of extracting, from the image area of the half-body determined by the half-body area determination step, a shape feature vector;
    a three dimensional half-body pose calculation step of calculating, in accordance with the shape feature vector extracted by the feature extraction step, a three dimensional pose of the half-body, by utilizing a feature mapping matrix corresponding to the half-body; and
    a three dimensional half-body pose combination step of combining three dimensional pose recognition results of the left half and right half portions of the human body to obtain a three dimensional pose of the whole human body.

14. A non-transitory computer-readable medium including machine readable instruction codes stored thereon, which when being read and executed by a machine performs a three dimensional human pose recognition method, wherein the three dimensional human pose recognition method comprises steps of:
    a three dimensional pose initial recognition step of performing three dimensional pose recognition on an input image containing a human image to obtain image-based three dimensional human pose information;
    a sensor information acquisition step of acquiring, by a motion sensor, motion information of human articulation points; and
    a three dimensional pose correction step of correcting, with the motion information acquired by the sensor information acquisition step, the image-based three dimensional human pose information recognized by the three dimensional pose initial recognition step, wherein
    the three dimensional pose initial recognition step further comprises:
        a half-body area determination sub-step of determining, from the input image, an image area of a half-body which is a left half portion or a right half portion of a human body;
        a feature extraction sub-step of extracting, from the image area of the half-body determined by the half-body area determination sub-step, a shape feature vector;
        a three dimensional half-body pose calculation sub-step of calculating, in accordance with the shape feature vector extracted by the feature extraction sub-step, a three dimensional pose of the half-body, by utilizing a feature mapping matrix corresponding to the half-body; and
        a three dimensional half-body pose combination sub-step of combining three dimensional pose recognition results of the left half and right half portions of the human body to obtain the image-based three dimensional pose information of the whole human body.

* * * * *